(12) United States Patent
Bakoledis

(10) Patent No.: US 6,551,052 B2
(45) Date of Patent: Apr. 22, 2003

(54) SHEET AND STACK FEEDING MECHANISM

(75) Inventor: Andrew Bakoledis, Chester, CT (US)

(73) Assignee: GBR Systems Corporation, Chester, CT (US)

( * ) Notice: Subject to any disclaimer, the term of this patent is extended or adjusted under 35 U.S.C. 154(b) by 0 days.

(21) Appl. No.: 09/919,977

(22) Filed: Aug. 2, 2001

(65) Prior Publication Data

US 2001/0052669 A1 Dec. 20, 2001

Related U.S. Application Data

(63) Continuation-in-part of application No. 09/902,996, filed on Jul. 12, 2001.

(51) Int. Cl.$^7$ .................. B65G 57/06; B65H 31/30
(52) U.S. Cl. .................. 414/790.3; 414/789; 414/790.2; 271/3.01
(58) Field of Search ................ 271/3.01, 3.03, 271/207, 212; 414/789, 790.3, 790.2

(56) References Cited

U.S. PATENT DOCUMENTS

| | | | |
|---|---|---|---|
| 3,785,256 A | * 1/1974 | Nikkel | .......................... 93/93 |
| 3,888,587 A | 6/1975 | Peri | |
| 4,130,207 A | * 12/1978 | Cogswell et al. | ............... 214/6 |
| 4,354,336 A | 10/1982 | Azzaroni | |
| 4,453,870 A | * 6/1984 | Bean | .......................... 414/43 |
| 4,514,958 A | 5/1985 | Hoorn | |
| 4,539,794 A | 9/1985 | Azzaroni | |
| 4,553,369 A | 11/1985 | Debes | |
| 4,577,452 A | 3/1986 | Hosel | |
| 4,590,738 A | 5/1986 | Hosel | |
| 4,640,506 A | * 2/1987 | Luperti et al. | ............... 271/212 |
| 4,692,083 A | 9/1987 | Le Roux | |
| 4,750,853 A | * 6/1988 | Van Soest et al. | ............ 414/43 |
| 4,759,679 A | 7/1988 | Muller | |
| 4,775,138 A | 10/1988 | Muller | |
| 4,783,588 A | 11/1988 | Schmidt | |
| 4,788,810 A | 12/1988 | Bauer | |
| 4,826,383 A | * 5/1989 | Millen | ..................... 414/789.9 |
| 5,000,657 A | * 3/1991 | Gunther, Jr. | ............. 414/790.3 |
| 5,103,982 A | * 4/1992 | Walter et al. | ................ 209/547 |
| 5,109,649 A | 5/1992 | Azzaroni | |
| 5,147,092 A | * 9/1992 | Driscoll et al. | ............. 271/184 |
| 5,178,379 A | * 1/1993 | Edwards et al. | ............ 271/189 |
| 5,251,892 A | * 10/1993 | No et al. | ..................... 271/184 |
| 5,253,861 A | * 10/1993 | Schmalling | .................. 271/213 |
| 5,342,038 A | * 8/1994 | Suter | .......................... 271/198 |
| 5,383,656 A | * 1/1995 | Mandel et al. | ......... 271/258.01 |
| 5,435,542 A | * 7/1995 | Van Pham et al. | .......... 271/246 |
| 5,462,265 A | 10/1995 | Mandel | |
| 5,484,255 A | * 1/1996 | Lowell | ........................ 414/789 |
| 5,545,000 A | * 8/1996 | Gorsky | .................... 414/790.3 |
| 5,545,001 A | 8/1996 | Capdeboscq | |
| 5,727,923 A | 3/1998 | Michel | |
| 5,913,514 A | 6/1999 | Moser | |
| 6,032,953 A | * 3/2000 | Otto et al. | .................. 271/303 |
| 6,209,864 B1 | * 4/2001 | Taniguchi et al. | .......... 271/220 |
| 6,418,357 B1 | * 7/2002 | Chodack et al. | ............ 700/220 |

* cited by examiner

Primary Examiner—Donald P. Walsh
Assistant Examiner—Daniel K Schlak
(74) Attorney, Agent, or Firm—Joseph J. Previto

(57) ABSTRACT

A sheet and stack feeding mechanism comprising an accumulating area, a mechanism for feeding sheets into the accumulating area, a pair of exit rollers and a mechanism for moving the stack of sheets out of the accumulating area through the exit mechanism, the exit roller being resilient to permit stacks of various thickness to pass therethrough.

21 Claims, 2 Drawing Sheets

SHEET AND STACK FEEDING MECHANISM

RELATED APPLICATION

This application is a continuation in part of U.S. patent application Ser. No. 09/902,996 filed Jul. 12, 2001.

BACKGROUND

The present invention relates to a sheet and stack feeding mechanism and more particularly to a mechanism for accumulating sheets in a stack and discharging them as a stack.

In present high speed sheet feeding mechanisms, sheets are fed one by one to an accumulating area where sheets accumulate in a stack. When a certain number of sheets have been deposited in the stack, the entire stack is moved out of the accumulating area to another machine or to another portion of the machine. In current sheet feeding mechanisms, printed sheets are subject to being smudged when they are moved out of the accumulating area. This is especially true if transport belts are used in the accumulating area to move the sheets and stack into and out of the accumulating area. Furthermore, the mechanism for removing the entire stack out of the accumulating area usually must be adjusted in order to accommodate stacks of different thicknesses. In addition, it is sometimes desirable to feed and stack the sheets in the accumulating area one below the other. In existing machines, it has been difficult to do this without readjusting the entire machine. Moreover, existing machines, do not have the versatility of permitting sheets to be accumulated one on top of the other or one beneath the other.

OBJECTS

The present invention overcomes these difficulties and has one its objects the provision of an improved sheet feeding mechanism in which a stack of sheets can be easily moved out of the accumulating area.

Another object of the present invention is the provision of an improved sheet feeding mechanism in which a stack of sheets may be easily moved out of an accumulating area without smudging.

Another object of the present invention is the provision of an improved sheet feeding mechanism in which the same mechanism can be used to move stacks of sheets of various thicknesses out of the accumulating area.

Another object of the present invention is the provision of an improved sheet feeding mechanism in which sheets can be accumulated in an accumulating area one under the other.

Another object of the present invention is the provision of an improved sheet feeding mechanism which can be easily converted to feed and stack sheets one beneath the other or one above the other.

Other and further objects of the invention will be obvious upon an understanding of the illustrative embodiment about to described, or will be indicated in the appended claims and various advantages not referred to herein will occur to one skilled in the art upon employment of the invention in practice.

DRAWINGS

A preferred embodiment of the invention has been chosen for purposes of illustration and description and is shown in the accompanying drawings forming a part of the specification, wherein.

DESCRIPTION

Figure 3:
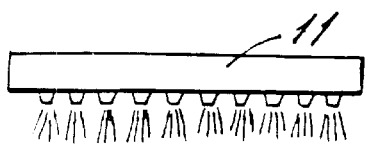
FIG. 3 is a schematic front view of a portion of the mechanism shown in FIG. 1.
Figure 1:
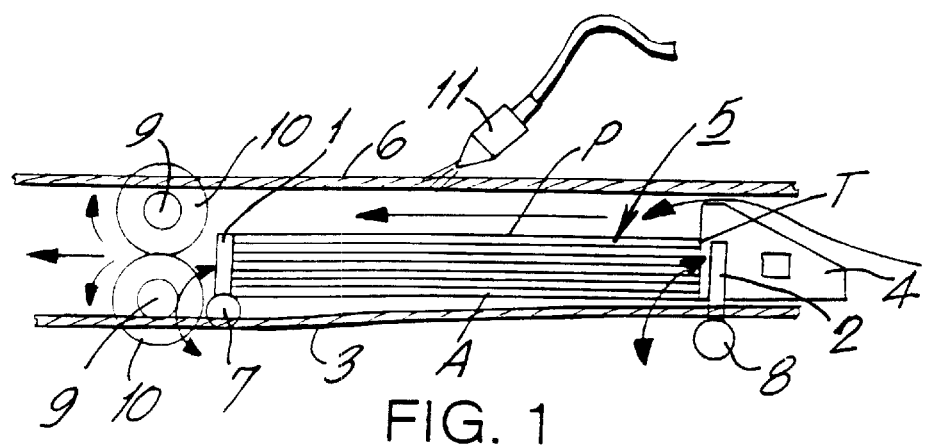
FIG. 1 is a schematic side elevational view of the present invention.
Figure 2:
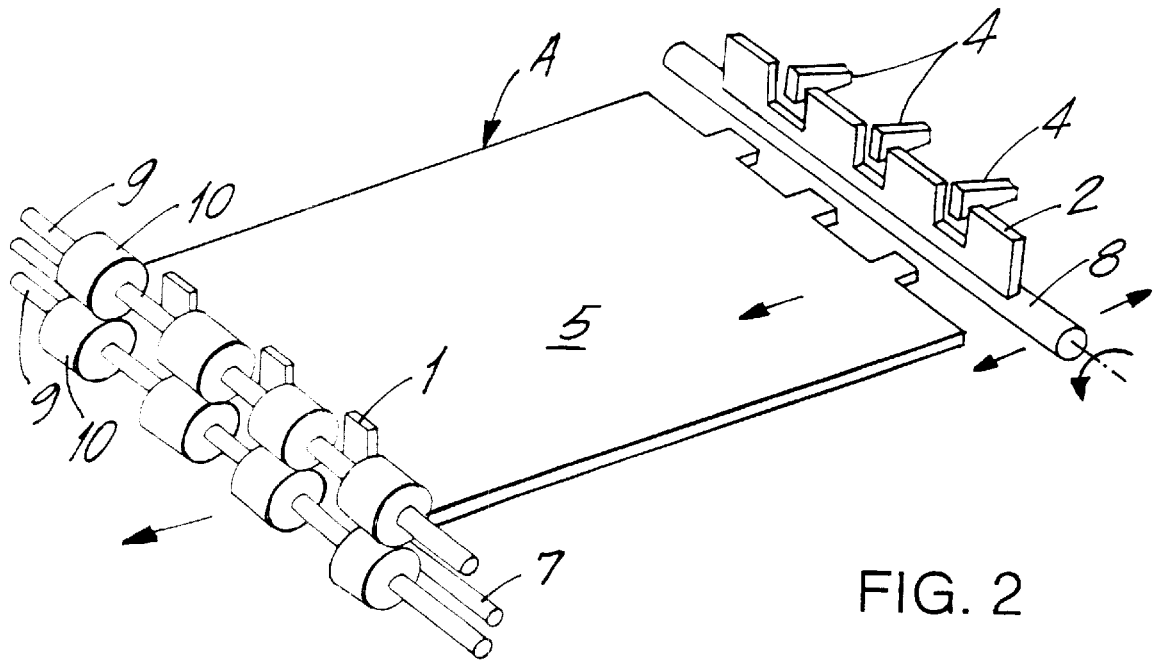
FIG. 2 is a schematic perspective view thereof.

Referring to the drawings and to the embodiment shown in FIGS. 1–3, sheets of paper P are fed one by one into an accumulating area A where they accumulate in a stack S. The accumulating area A comprises a front gate 1, rear pusher or kicker 2 and superimposed cables or rods 3 and 6 between which the sheets P are accumulated and a ramp 4 over which the sheets P pass. Alternately, the sheets P may accumulate on an accumulating bay or platform 5 (FIG. 2). In either event, there are no transport belts in the accumulating area A so that the sheets P are not continuously rubbed as they are being deposited.

A plurality of pairs of superimposed exit pinch rollers 10 are provided in front of the accumulating area A to direct the stack S from the accumulating area A to another portion of the machine (not shown). The front gate 1 is pivotally mounted on shaft 7 to swing back and forth from a raised position in front of the stack S to act as a gate or stop for the stack S of sheets P in the accumulating area A to a lowered position out of the way of the stack S so as to free the stack S of sheets P to move forward. The rear pusher 2 is adapted to swing back and forth on shaft 8 from a raised position behind the trailing edges T of the sheets P to a forward position where it strikes the trailing edge T of the stack S of sheets P to push it forward and through the exit pinch rollers 10 as a unit. The movement of the front gate 1 and the rear pusher 2 are coordinated so that when the rear pusher is swung forward to push the stack S, the front gate 1 is moved down and out of the way to allow the stack S to move forward. An air spray mechanism 11 may be provided across the top of the accumulating area A to provide an amount of air to tamp the sheets P and maintain the sheets P flat on the stack S as they are deposited thereon.

In front on the release gate 1 the exit pinch rollers 10 are rotatable on shafts 9 and are made of a resilient material which preferably may be a polyurethane resilient foam which has a low to medium density. They are resilient enough to be compliant or easily squeezed by thick stacks S but also have a coefficient of surface friction high enough to grasp and move the stacks S forward between them as a unit. These factors allow for transporting the stack S of printed sheets P through the exit pinch rollers 10 as a unit without smudging any of the printed sheets P. In addition, the compliancy and resilience of the foam of the exit pinch rollers 10 permit stacks of different heights to be moved through the exit pinch rollers 10 without the necessity of adjusting the distance between them. When a sufficient number of sheets P have been deposited in the accumulating area A, control means (not shown) sense the height of the stack and activate the pusher 2 and gate 1 so that the pusher 2 is swung forward to push the stack while the release gate 1 is swung down to free the stack for forward movement. The pusher 2 pushes the trailing edges T of the sheets P in the stack S to move the entire stack S (as a unit) out of the accumulating area A through the resilient exit pinch rollers 10 which grasp that stack S and move it forward.

Figure 4:
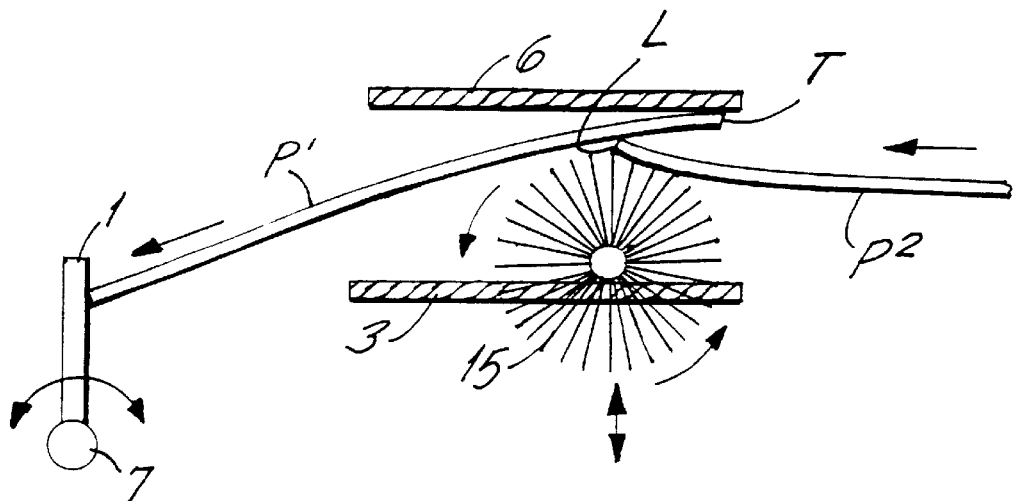
FIG. 4 is a schematic fragmentary side elevational view of another embodiment of the present invention.
Figure 5:
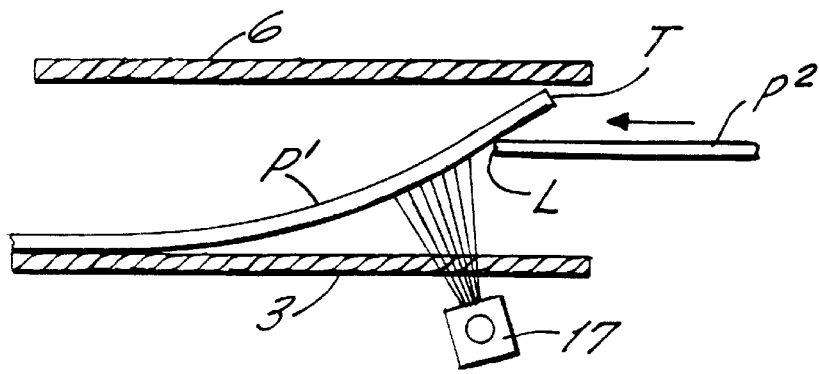
FIG. 5 is a schematic fragmentary side elevational view of another embodiment of the present invention.
Figure 6:
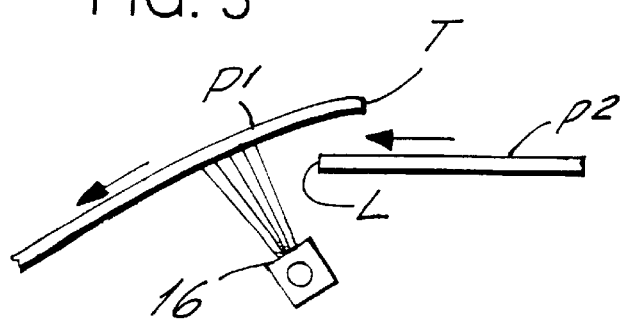
FIG. 6 is a schematic fragmentary side elevational view of another embodiment of the present invention.

Referring to the embodiment of FIG. 4, in which the reference characters used for some parts are the same as the reference characters used in the embodiment of FIGS. 1–3 for the same parts, the mechanism shown is adapted to permit sheets P to be stacked one under the other. A support mechanism, such as a brush 15, is provided in the accumulating area A and extends there into from the bottom. When a previous sheets p1 is moved into the accumulating area A, the brush 15 allows the leading edge L of the previous sheet p1 to pass through to the release gate 1 but holds the trailing edge T of the previous sheet p1 in a raised or uplifted position so that the leading edge of a subsequent sheet p2 can pass beneath the bottom of the previous sheet p1. This continues with each sheet being fed until the desired stack quantity is reached. The brush 15 can be a freely rotatable or stationary round brush. The brush may also be an angled straight brush 16 as shown in the embodiment of FIG. 5. In either instance, the brush 15 or 16 may be made of conductive material to eliminate static electricity. As another alternative, as shown in FIG. 6, an air knife or air brush 17 may be provided to direct air against the trailing edge T of the previous sheet p1 to keep the trailing edge T of the first sheet p1 in a raised position until the leading edge L of the subsequent sheet p2 is moved underneath it.

As shown in FIG. 4, the brush 15 is movable up and down relative to the accumulating area A. This permits the same mechanism to be used for stacking sheets P one on top of the other and for accumulating the sheets by understacking them one beneath the other. When the sheets P are to be stacked one on top of the other, the brush 15 is moved down out of the way and below the cable 3 so that sheets P moving into the accumulating area A will lie on the cable 3 and will accumulate one on top of the other. Since the brush 15 is down and out of the way, the sheets P will not strike the brush 15. However, when it is desired to understand the sheets and have the sheets accumulate one under the other, the brush 15 is raised so that now the sheets coming into the accumulating area A will strike the brush 15 and the rear end of a sheet P1 will be held in an elevated position until a second sheet P2 is fed into the accumulating area A under the first sheet P1. When it is desired to again accumulate sheets one on top of the other, the brush 15 is again lowered out of the way. Hence, this invention provides a mechanism with the versatility for stacking one on top of the other or one under the other.

A similar versatility provided in the embodiment shown in FIG. 5, brush 16 may be pivoted from an upper position in the path of the sheets P or to a lower position below the cable 3 and out of the sheet path (not shown) so that the sheets P may accumulate one on top of the other. When the brush 16 is raised, the sheets accumulate one below the other. The alternative shown in FIG. 6 is similarly versatile. If it is desired to accumulate the sheets one on top of the other, the air brush 17 may either be shut off or moved out of the way in order to permit the sheets to accumulate one over the other or the air brush 17 may be turned on or the air brush 17 may be moved back under the rear of the assembly area A so that it impinges on the rear edge T of the incoming sheets P and keeps the rear edge T of a first sheet P1 elevated until another sheet P2 is fed into the accumulating area A under a first sheet P1.

It will thus be seen that the present invention provides an improved sheet and stack feeding mechanism in which a stack can be easily moved out of the accumulating area, in which the same mechanism can be used to move stacks of sheets of various thicknesses out of the accumulating area, in which sheets may be accumulated in the accumulating area one under the other which may be easily connected to feed sheets one over the other or one below the other and which is simple to use and inexpensive to manufacture and maintain.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A sheet and stack feeding mechanism comprising an accumulating area, mean for feeding sheets into said accumulating area to form a stack of sheets, an exit mechanism, means for moving a stack of sheets from said accumulating area through said exit mechanism, said exit mechanism comprising a pair of exit rollers, said moving means adapted to move a stack of sheets between said exit rollers, each of said exit rollers being resilient and having a resilient outer surface, each of said exit rollers being mounted on a rigid shaft, said shafts being parallel to each other and the distance between said shafts being constant.

2. A sheet and stack feeding mechanism as set forth in claim 1, wherein a pusher mechanism is provided adjacent the rear of said accumulating area and wherein means are provided to activate the pusher mechanism to push a stack of sheets out of the accumulating area.

3. A sheet and stack feeding mechanism as set forth in claim 2, wherein said pusher mechanism activating means comprises means to swing the pusher mechanism back and forth from a position behind a stack of sheets in the accumulating area to a forward position to push a stack out of the accumulating area.

4. A sheet and stack feeding mechanism as set forth in claim 3, wherein a release gate mechanism is provided in front of a stack being accumulated in said accumulating area and wherein means are provided to activate and move the gate out of the way to permit a stack of sheet to be moved out of the accumulating area.

5. A sheet and stack feeding mechanism as set forth in claim 4, wherein sensing means are provided to sense the thickness of a stack and wherein said sensing means activates said pusher and said release gate mechanism.

6. A sheet and stack feeding mechanism as set for thin claim 5, wherein movement of the pusher and the release gate mechanism are coordinated so that the pusher is moved forward while the release gate mechanism is moved away from the front of a stack.

7. A sheet and stack feeding mechanism as set forth in claim 6, wherein said exit rollers are make of polyurethane foam material.

8. A sheet and stack feeding mechanism as set forth in claim 7, wherein the foam material of the resilient exit rollers have a low to medium density.

9. A sheet and stack feeding mechanism as set forth in claim 8, wherein said exit rollers have a coefficient of surface friction high enough to grasp and move a stack of sheets.

10. A sheet and stack feeding mechanism as set forth in claim 9, wherein said exit rollers have sufficient resiliency to permit stacks of sheets of different widths to pass therebetween.

11. A sheet and stack feeding mechanism as set forth in claim 10, wherein the resilience of the said exit rollers is such to prevent smudging of any printing on sheets.

12. A sheet and stack feeding mechanism comprising an accumulating area, means for feeding at least one sheet into said accumulating area, an exit mechanism having at least one resilient exit roller, means for moving sheets from said accumulating area through said exit mechanism, said exit mechanism comprises a pair of exit rollers and wherein a stack of sheets is adapted to pass between said exit rollers when moving through the exit mechanism, each of said exit rollers is resilient, a pusher mechanism is provided adjacent the rear of said accumulating area and wherein means are provided to activate the pusher mechanism to push a stack of sheets out of the accumulating area, a release gate mechanism is provided in front of a stack being accumulated in said accumulating area and wherein means are provided to activate and move the gate out of the way to permit a stack of sheets to be moved out of the accumulating area, sensing means are provided to sense the thickness of a stack and wherein said sensing means activates said pusher and said release gate mechanism, movement of the pusher and the release gate mechanism are coordinated so that the pusher is moved forward while the release gate mechanism is moved away from the front of the stack, said exit rollers are made of polyurethane foam material, the foam material of the resilient exit rollers have a low to medium density, said exit rollers have coefficient of surface friction high enough to grasp and move a stack of sheets, said exit rollers have sufficient resiliency to permit stacks of sheets of different widths to pass therebetween, the resilience of the said exit rollers is such to prevent smudging of any printing on sheets and wherein sheets accumulate between at least a pair of superimposed cables.

13. A sheet and stack feeding mechanism as set forth in claim 12, wherein ramp means are provided over which sheets pass before entering said accumulating area, said ramp means being adapted to deposit sheets in the accumulating area one on top of the other.

14. A sheet and stack feeding mechanism as set forth in claim 13, wherein means are provided to tamp each sheet being accumulated in order to permit sheets to lie flat one on top of each other.

15. A sheet and stack feeding mechanism as set forth in claim 12, wherein support means are provided to keep the trailing edge of a previous sheet fed in the accumulating area uplifted until the leading edge of a subsequent sheet is moved beneath a previous sheet.

16. A sheet and stack feeding mechanism as set forth in claim 15 wherein said support means are adjustable from a mode keeping said trailing edge uplifted to a mode not uplifting the trailing edge.

17. A sheet and stack feeding mechanism as set forth in claim 15, wherein said support means is a brush.

18. A sheet and stack feeding mechanism as set forth in claim 17, wherein said brush is a round brush.

19. A sheet and stack feeding mechanism as set forth in claim 18, wherein said round brush is rotatable.

20. A sheet and stack feeding mechanism as set forth in claim 19, wherein said brush is made of a conducting material.

21. A sheet and stack feeding mechanism as set forth in claim 15, wherein said support means comprises means to direct air against the trailing edge of a previous sheet to keep it uplifted until the leading edge of a subsequent sheet is moved beneath it.

* * * * *